United States Patent

Lee

[11] Patent Number: 6,109,077
[45] Date of Patent: Aug. 29, 2000

[54] HOUSING ACCESS CONTROL DEVICE

[76] Inventor: Kin (Kim) Chung Lee, 46 Dawn Street, Dollard-des-Ormeaux, Canada, H9B 3C7

[21] Appl. No.: 08/944,703

[22] Filed: Oct. 6, 1997

Related U.S. Application Data

[62] Division of application No. 08/631,009, Apr. 12, 1996, abandoned.

[51] Int. Cl.[7] .............................. F16B 41/00; E05B 69/00
[52] U.S. Cl. .................................................. 70/232; 70/58
[58] Field of Search .............................. 70/232, 229, 230, 70/57, 58

[56] References Cited

U.S. PATENT DOCUMENTS

| | | |
|---|---|---|
| 3,434,312 | 3/1969 | Buchman . |
| 3,514,172 | 5/1970 | Buchman . |
| 3,564,879 | 2/1971 | Bennett . |
| 3,625,031 | 12/1971 | Allen, III . |
| 3,765,879 | 10/1973 | Foote . |
| 4,094,173 | 6/1978 | Brown . |
| 4,313,321 | 2/1982 | Wasser . |
| 4,438,642 | 3/1984 | De Jong . |
| 4,444,031 | 4/1984 | Watson . |
| 4,655,060 | 4/1987 | Jakubas . |
| 4,724,689 | 2/1988 | Anchia . |
| 4,761,975 | 8/1988 | Kachnowski et al. . |
| 4,817,402 | 4/1989 | Leiding . |
| 4,856,305 | 8/1989 | Adams . |
| 4,898,009 | 2/1990 | Lakoski et al. . |
| 4,924,683 | 5/1990 | Derman . |
| 5,076,079 | 12/1991 | Monoson et al. . |
| 5,162,976 | 11/1992 | Moore et al. . |
| 5,199,286 | 4/1993 | Jakubas . |
| 5,447,044 | 9/1995 | Cheng . |
| 5,447,045 | 9/1995 | Cheng . |
| 5,502,989 | 4/1996 | Murry, Jr. et al. . |

*Primary Examiner*—B. Dayoan
*Attorney, Agent, or Firm*—Fay, Sharpe, Fagan, Minnich & Mckee, LLP

[57] ABSTRACT

An access control device to discourage and prevent theft of the contents of a box, enclosure or container, such as a computer, is provided; the access control device comprises an anchor member and a cover engagement member for engaging the cover of the container, the device is configured and disposed such that the anchor member can be secured to the container in a way that the cover engagement member prevents the unauthorized opening of the cover. The anchor member comprises an anchor opening, and may be releasably locked into position in such a way as to render a fastener inaccessible and therefore impede the unauthorized removal of the access control device.

6 Claims, 10 Drawing Sheets

HOUSING ACCESS CONTROL DEVICE

This is a divisional of application Ser. No. 08/631,009, filed Apr. 12, 1996, now abandoned.

The present invention relates to a security device for inhibiting unauthorised entry into the interior of a housing, such as for example a, enclosure, container or the like, e.g. a personal computer. The invention will be described hereinafter with respect to an enclosure for a computer, e.g. a personal computer, but it is to be understood that the invention is not to be limited thereto.

The operating components of a computer are usually disposed within the interior of a computer housing. The computer typically comprises an enclosure component having an opening for access to the operating components such as the central processing unit (i.e. the CPU), disc drives, memory chips (e.g. memory simms) and the like. The computer access opening is typically releasably coverable by a cover component; the cover component may for example be pivotally attached to the enclosure component or it may slidably engage the enclosure component for covering the opening. Typically such cover components are not provided with any cover locking means for inhibiting their displacement. Accordingly, unauthorised access to the interior of the computer is possible with such types of computer construction, i.e. with no means to inhibit access to the interior of the computer the various operating components are at risk to being stolen by a thief.

A number of security mechanisms are known which may be used with computers to prevent access to the interior thereof; see, for example, U.S. Pat. No. 5,162,976, and U.S. Pat. No. 4,898,009. A number of security devices are known which inhibit theft of the entire computer; see for example U.S. Pat. No. 4,856,305. Other anti-theft security devices are known for the prevention of the theft of entire articles; see U.S. Pat. No. 4,724,689, U.S. Pat. No. 4,438,642 and U.S. Pat. No. 4,444,031.

A (personal) computer may also be equipped with other peripheral input and output devices such as, for example, a mouse, a keyboard, an optical scanner (e.g. for inputting text or graphics), a printer, a monitor, storage devices (e.g. hard drives, tape drives . . . ), etc. These types of add-on devices are usually attached to the computer by means of some type of electric cable have a connector end adapted to be electrically attached to a component in the computer housing which has a corresponding electrical connector. Although some such cable connectors are attached to the computer by some sort of screw connectors, they generally are usually easily accessible for being detached from the computer, i.e. they are also at risk of being stolen.

A continuing need therefore still exists for a simple access control device which may be used with known computer enclosure and cover components, i.e. a security access device which may be merely attachable to the computer enclosure using an already existing fastening component of the enclosure (i.e. an opening able to engage a screw fastener).

It would also be advantageous to have an alternate and simple device which may be used with computer enclosure and cover components so as to inhibit removal of peripheral devices attached to the components of a computer by an electrical cable.

STATEMENT OF INVENTION

In a general aspect the present invention thus provides an access control device for a housing (such as for example a box, a container or the like, e.g. a personal computer enclosure) comprising an enclosure component having an access opening for allowing access to the interior of said enclosure component and a cover component, said cover component being displaceable between a closed position wherein said opening is covered and an open position wherein said opening is uncovered, said device comprising
an anchor member comprising an anchor opening,
a cover engagement member for engaging the cover component,
said anchor opening being configured such that a head member of a releasable fastener means is unable to pass therethrough (e.g. the head member may be sized smaller than the anchor opening),
said anchor member and said cover engagement member being configured and disposed such that said releasable fastener means is able to be attached to the enclosure component, through said anchor opening, such that said head member is disposed at a fastening position wherein said head member is able to maintain said device in a lock position wherein said cover engagement member is able to engage said cover component when said cover component is in said closed position, and
means for the releasable locking isolation of the fastener means so as to render the fastener means inaccessible for the displacement of said head member from said fastening position to a release position wherein the device is displaceable from said lock position to an unlock position wherein said cover engagement member is unable to engage said cover component.

It is to be understood, herein, of course that a release position may be one wherein the device may still be connected to the enclosure component; the ultimate release position being the one wherein the access control device in completely detached from the enclosure component.

The cover engagement member may take on any desired or necessary form keeping in mind its function, namely to engage the cover component for the purpose of inhibiting the displacement or removal thereof from the enclosure opening, i.e. to inhibit access to the interior of the enclosure component by inhibiting the removal of the cover component from a covering position over the enclosure opening. The cover engagement member may similarly be connected to the anchor member in any desired or necessary manner again keeping in mind the purpose of the device, namely to control access to the interior of the enclosure component of a housing (such as for example a box, enclosure container or the like of a personal computer). It also to be understood that a device of the present invention may be exploited to operate with a cover component which is pivotally attached an enclosure component, which slideably engages an enclosure component . . . etc.

In accordance with the present invention the means for releasable locking isolation of the releasable fastener means may take on any desired or necessary configuration.

The means for releasable locking isolation of the releasable fastener means may, for example, comprise lock shackle support means projecting from the anchor member. The shackle support means may comprise aperture means for receiving a lock shackle of a padlock transversely with respect to the longitudinal axis of the anchor opening; the lock shackle is disposed so as to render for example, the head member of a screw fastener means inaccessible for the displacement (e.g. detachment) of the screw fastener means from the enclosure component.

Alternatively, the means for releasable locking isolation of the releasable fastener means may, for example, comprise a cover component which is slidably or pivotally attached to an anchor member so as to be displaceable between a cover position wherein the head member of a screw fastener means is inaccessible for displacement and a exposed position wherein the head member of a screw fastener means is accessible for displacement.

An enclosure component may for example have an access opening for allowing access to the interior of said enclosure component and a hinged cover component for displaceably covering said access opening. The hinged cover may comprise a hinged edge and a non-hinged edge, the hinged edge being attached by hinge means to the enclosure component such that the cover may be pivoted about the hinge means between a closed position wherein the access opening is blocked off and an open position for allowing access to the interior of said enclosure component.

In accordance with the present invention the cover engagement member may comprise a connector component and an abutment component connected to said connector component. The connector component may be disposed transversely to the longitudinal axis of the anchor opening. The abutment component may extend transversely from the connector component for abutting the cover component so as to block the displacement of the cover component when the device is attached to the enclosure component by said fastener means and the cover component covers said access opening.

In accordance with the present invention the releasable fastener means may comprise a screw fastener; the screw fastener comprises a said head member is sized larger than the anchor opening such that the head member is unable to pass through the opening.

The anchor member may, for example, comprise a hollow sleeve having an anchor opening at one end and having side wall means provided with aperture means for receiving the shackle of a padlock so as to render the releasable fastener means (e.g. a screw fastener means) inaccessible for the displacement of the head member.

Thus in accordance with a particular aspect the present invention provides an access control device for a housing (such as for example a box, a container or the like, e.g. a personal computer enclosure) comprising an enclosure component having an access opening for allowing access to the interior of said enclosure component and a cover component, said cover component being displaceable between a closed position wherein said opening is covered and an open position wherein said opening is uncovered, said device comprising
a hollow sleeve,
and
a cover engagement member,
said hollow sleeve comprising side wall means, an open end and a closed end, said closed end being provided with an anchor opening having a longitudinal axis, said anchor opening being able to accommodate a screw threaded shank member of a screw fastener means and being configured such that a head member attached to said shank member is unable to pass therethrough,
said cover engagement member comprising an abutment component and a connector component, said connector component being connected to said sleeve and being disposed transversely to said longitudinal axis, said abutment component extending transversely from said connector component for abutting the cover component,
said hollow sleeve and said cover engagement member being configured and disposed such that said screw fastener means is insertable through the open end of said sleeve and said shank member is insertable through said anchor opening for releasable screw attachment of the head member to the enclosure component at a fastening position wherein the device is able to be maintained by said head member in a lock position wherein said abutment component is able to abut said cover component, and
said hollow sleeve being provided with aperture means in the side wall means thereof for receiving a lock shackle of a padlock transversely to said longitudinal axis so as to render the head member of the screw fastener means inaccessible for the displacement of the head member from said fastening position to a release position wherein the device is displaceable from said lock position to an unlock position wherein said abutment component is unable to engage said cover component.

In accordance with the present invention the connector component may be connected to the closed end of said sleeve.

As mentioned above a cover abutment member extends transversely from said anchor member for abutting the cover component when the cover component covers said access opening; the cover abutment member is disposed so as to block the displacement of the cover component when the device is attached to the enclosure component by a said screw fastener means.

In accordance with another aspect of the present invention there is provided an access control device for a housing (such as for example a box, a container or the like, e.g. a personal computer enclosure) comprising an enclosure component having an access opening for allowing access to the interior of said enclosure component and a cover component, said cover component being displaceable between a closed position wherein said opening is covered and an open position wherein said opening is uncovered, said device comprising a cover abutment member for abutting the cover component,
lock means comprising a rotatable key plug disposed in a casing, said key plug having an outer end for receiving a key for the rotation of said plug and an inner end,
an anchor member attached to the casing, said anchor member comprising anchor opening means and lock bolt channel means, said anchor opening being able to accommodate a screw threaded shank member of a screw fastener means comprising a head member attached to said shank member, said anchor opening being configured such that the head member is unable to pass therethrough,
said screw fastener means being able to attach the head member thereof to the enclosure component through said anchor opening at a fastening position wherein the device is able to be maintained by said head member in a lock position wherein said cover engagement member is able to engage said cover component,
a lock bolt seated in said lock bolt channel means and being displaceable between an uncover position wherein the anchor opening is unobstructed by said bolt and a cover position wherein the anchor opening is obstructed by said bolt, the head member of the screw fastener means, when said lock bolt is in said uncover position, being accessible for displacement from said fastening position to a release position wherein the device is displaceable from said lock position to an unlock position wherein said cover engagement member is unable to engage said cover component, the head member of the screw fastener means, when said lock bolt is in said cover position, being inaccessible for the displacement of said head member from said fastening position to said release position, said inner end of said key plug, said anchor opening, said lock bolt and said lock bolt seat being configured and disposed such that said lock bolt is displaceable, by rotation of said plug, between said uncovered position and said covered position.

In accordance with the present invention the key plug may have an inner end having an eccentric locking stud projecting therefrom, and the lock bolt may have a stud engagement opening. In this case the eccentric locking stud projects into the stud engagement opening, the stud being key displaceable between an unlocked position whereby the lock bolt is in a retracted (e.g. uncovered) position and a locked position whereby said lock bolt is in an extended (e.g. covered) position, the stud being movable into engagement with said slot so as to urge said bolt between said retracted and extended positions.

In accordance with the present invention the anchor member may comprise anchor opening means and a lock bolt bore/slot/channel. The bore/channel may extend transversely with respect to the longitudinal axis of the anchor opening such that the bore/channel transversely intersects the anchor opening so as to divide the anchor opening into a first opening and a second opening. The anchor opening is able to accommodate a screw threaded shank member of a screw fastener means comprising a head member attached to said shank member. However the anchor opening in this case is configured such that the head member is able to pass through the first opening but is unable to pass through said second opening. In this case the lock bolt is configured such that said bolt is displaceable between an extended (i.e. covering) position wherein the first opening is obstructed by said bolt such that the head member of the screw fastener means is inaccessible for the detachment of the shank member from the enclosure component and a retracted (i.e. uncovering) position wherein the first opening is unobstructed by said bolt such that the head member of the screw fastener means is accessible for the detachment of the shank member from the enclosure component.

The access control device may also be provided with a cable channel for receiving one or more cables of one or more peripheral devices. The cable channel may be disposed and configured such that when the device is locked in place, a cable opening is defined between the displaceable locking means and the rest of the device. Alternatively, the cable channel may be disposed and configured such that when the device is locked in place, a cable opening is defined between the between the device (i.e. anchor member) and the enclosure component. Such a cable opening is sized so as to be able to receive the cable of a peripheral device either snugly or loosely. However, the cable opening is also sized so as to be smaller than the electrical connector of such cable which is used to connect the cable to a computer component; the opening is of course also sized smaller then the peripheral device itself. Accordingly, when a cable of a peripheral device is disposed in such a cable opening, the peripheral device will also be attached to the computer, since neither end of the cable will be able to pass through the cable opening. Such a cable opening may for example be defined by exploiting cover component such as mentioned above.

In the drawings which illustrate example embodiments of the present invention:

FIGS. 1 to 5 illustrate an example embodiment of an access control device in accordance with the present invention.

The device has a hollow sleeve 1. The hollow sleeve 1 comprises cylindrical side wall means 2, an open end 3 and a closed end 4. The closed end 4 defines an anchor member and is provided with an anchor opening 5. The anchor opening 5 has a longitudinal axis 6.

Figure 1:
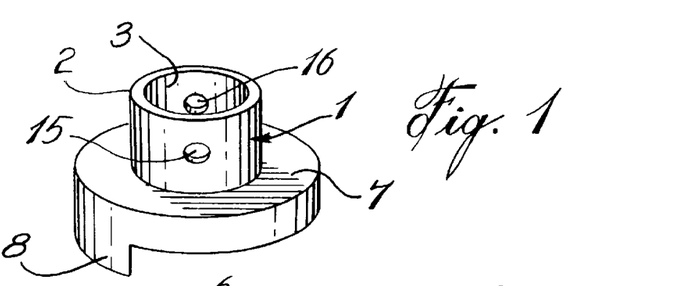
FIG. 1 is a schematic perspective view of an access control device in accordance with the present invention.
Figure 2:
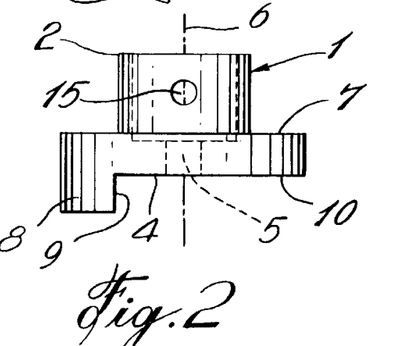
FIG. 2 is a side view of the access control device shown in FIG. 1.
Figure 3:
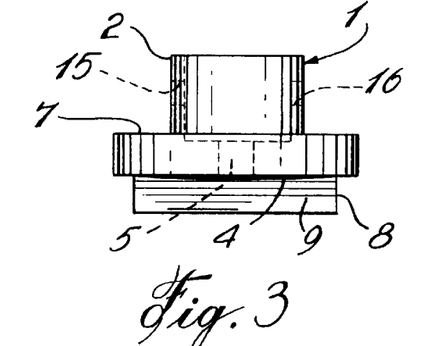
FIG. 3 is a front view of the access control device shown in FIG. 1; is a front view of the FIG. 4 is a top view of the access control device shown in FIG. 1; is
Figure 4:
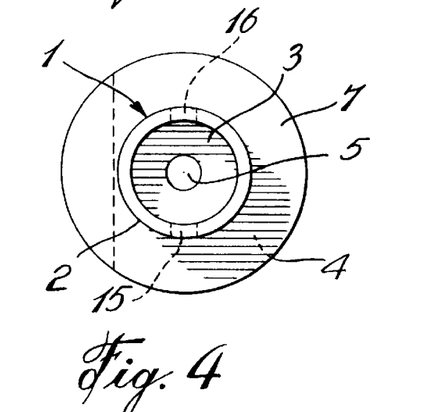
Figure 5:
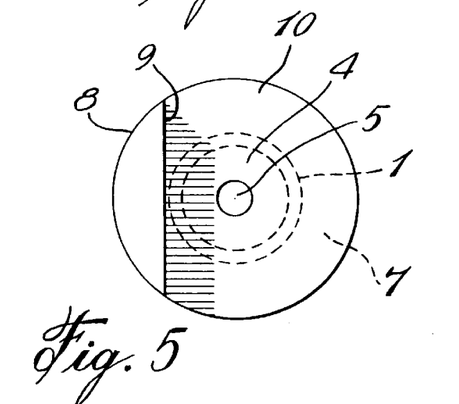
FIG. 5 is a bottom view of the access control device shown in FIG. 1.

The access control device has a peripheral, ring like connector component 7 which extends radially from the closed end 4 transversely with respect to the longitudinal axis 6. An abutment component 8 extends or projects transversely from the ring component 7 such that when viewed on the side (see FIG. 2) the ring connector component 7 and the abutment component 8 define a cover engagement member which has an L-shaped configuration. The abutment component has a planar surface 9 which is able to engage the cover component as shall be described below. The ring connector component 7 and the closed end 4 likewise define a planar surface 10; this surface is able to abut the enclosure component as shall also be described below.

The anchor opening 5 is configured or sized so as to be able to accommodate a screw threaded shank member of a screw fastener means. The anchor opening 5, however, is also configured or sized such that a head member attached to such a threaded shank member is unable to pass therethrough.

Figure 6:
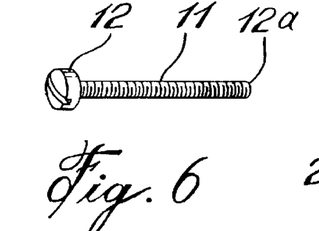
FIG. 6 illustrates an example releasable fastener means, namely a screw.

FIG. 6 illustrates a screw fastener means having a threaded shank member 11. A head member 12 is disposed at one end of the shank 11 while the other end 12a is a continuation of the shank 11 itself. As may be appreciated the shank member 11 (including the end 12a) is sized so as to be able to pass through the anchor opening 5 while the head member 12 is so sized that it is larger than the opening 5 and cannot pass therethrough.

The hollow sleeve 1 is configured such that a screw fastener means such as shown in FIG. 6 is insertable through the open end 3 of said sleeve and such that the shank end 12a (and the rest of the shank 11) is insertable in and through the anchor opening for releasable screw engagement with an opening in the enclosure component as shall be explained below (see FIGS. 10 to 12). As may be appreciated once the shank 11 of the screw fastener is attached to the enclosure component the head member 12 will abut the peripheral portion of the anchor member 4 defining the anchor opening 5. Since the head member 12 will effectively block the anchor opening 5, the head member 12 will inhibit displacement or removal of the device from the closure component.

Although the screw fastener in FIG. 6 is shown as being a unitary element with the head member fixed in place to one end of the shank 11, the head member of a fastener means could be defined for example by a nut; in this case the shank 11 could if desired be permanently fixed to the enclosure component in which case the free end of the shank 11 would be passed through the opening 5 into the interior of the hollow sleeve while the nut would be passed through the opening 3 for eventual screw engagement with the shank.

The device shown in FIGS. 1 to 5 also is provided with means for the releasable locking isolation of the releasable fastener means (e.g. the screw of FIG. 6) so as to render the fastener means inaccessible for the displacement of the head member. The hollow sleeve 1 is provided with aperture means comprising opposed openings 15 and 16 which are defined by the side wall means 2. The openings 15 and 16 are configured and disposed so as to both transversely receive a lock shackle 17 of padlock 18. The openings are of course disposed a sufficient distance away from the opening 5 such that a head member such as head member 12 of the fastener means will not interfere with the passage of the shackle 17 through both of the openings 15 and 16. When the shackle 17 is disposed in the openings 15 and 16, the longitudinal axis 20 of the shackle 17 is transverse to the longitudinal axis 6 of the anchor opening and blocks the interior of the hollow sleeve so as to render the head member of the screw fastener means inaccessible for the detachment of the shank member from the enclosure component (see FIG. 13).

Figure 8:
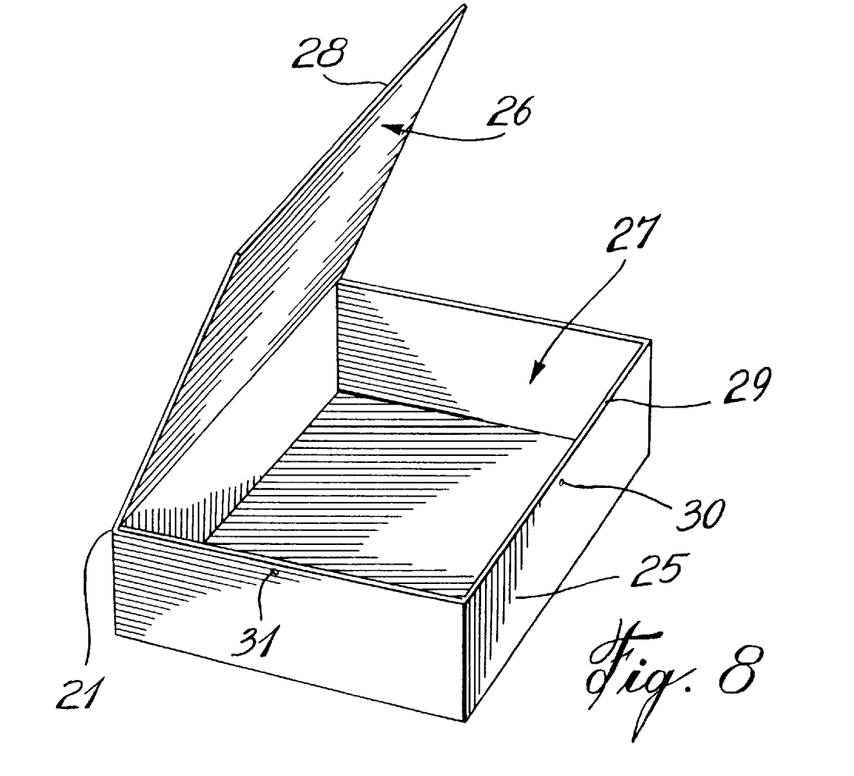
FIG. 8 is an example embodiment of an enclosure component and a cover component for a housing (such as for example a, enclosure, container or the like, e.g. a personal computer) the cover component being hingedly connected to the enclosure component.

Turning to FIG. 8, this figure illustrates an enclosure 25 and a cover 26. The cover 26 is pivotally connected along one edge thereof to the enclosure 25 by the hinge member 21.

The enclosure has an opening 27. When the cover 26 is in a closed position so as to block off the opening 27 the edge 28 of the cover abuts the edge 29 of the enclosure. The enclosure 25 has openings 30 and 31 for screw engagement with a threaded shank of a screw type fastening means.

Figure 9:
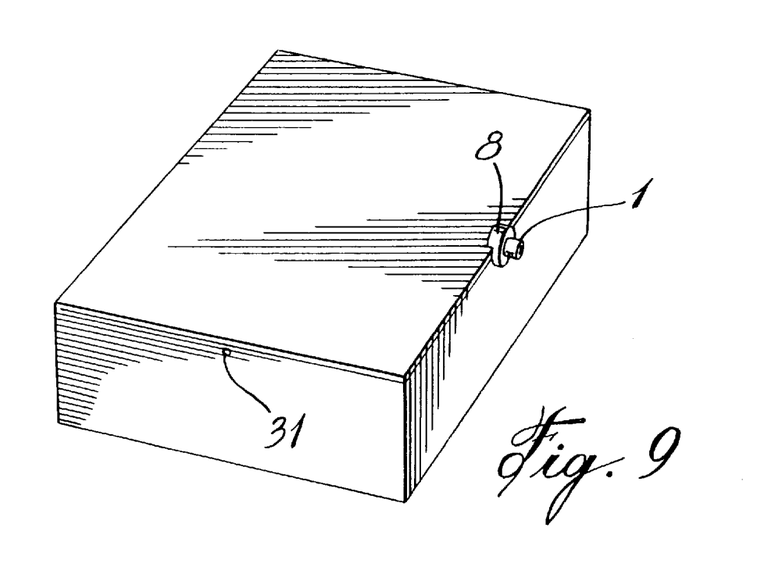
FIG. 9 illustrates the access control device of FIG. 1 attached to the enclosure component illustrated in FIG. 8 so that the cover component is locked shut.

FIG. 9 shows the cover 26 in a closed position. A device as shown in FIGS. 1 to 5 is attached to the enclosure 25 by a screw fastener as shown in FIG. 6, the shank 11 of which engages the opening 30.

Figure 10:
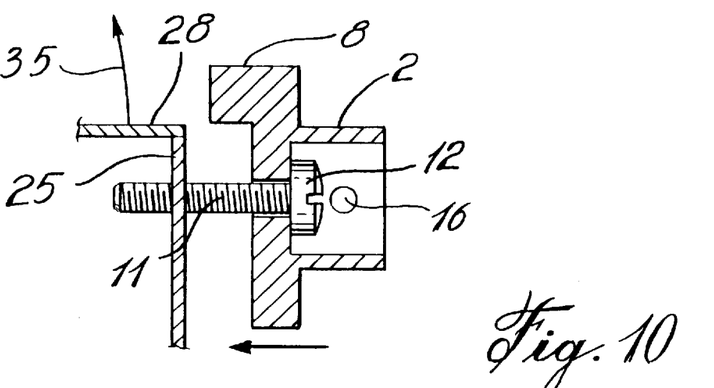
FIG. 10 is a sectional side view of the access control device of FIG. 1 attached to the enclosure component of FIG. 8 by a screw fastener means such that the device is in an unlock position relative to the cover component of FIG. 8.
Figure 11:
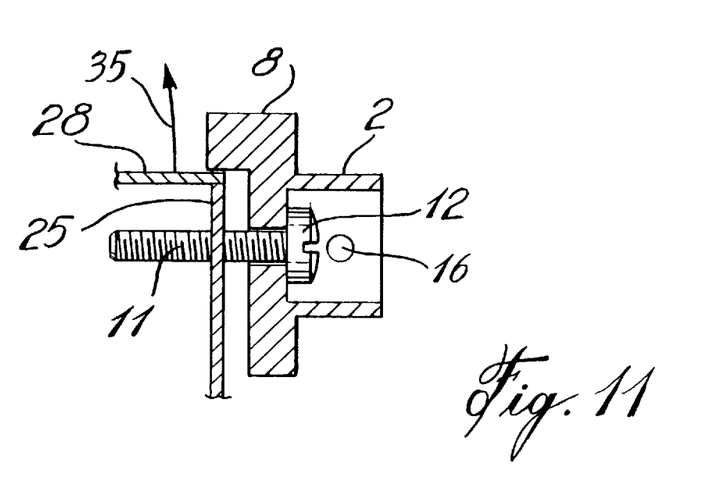
FIG. 11 is a sectional side view of the access control device of FIG. 1 attached to the enclosure component of FIG. 8 by a screw fastener means such that the device is in a lock position relative to the cover component of FIG. 8.
Figure 12:
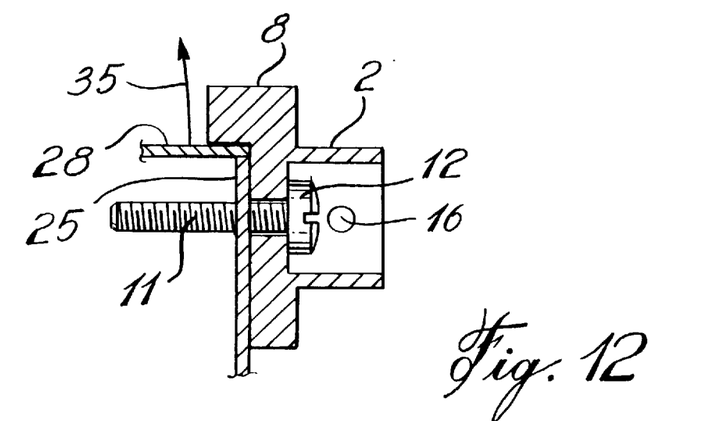
FIG. 12 is a sectional side view of the access control device of FIG. 1 attached to the enclosure component of FIG. 8 by a screw fastener means such that the device is in a lock position relative to the cover component of FIG. 8, the abutment component and the anchor member respectively abutting the cover component and the enclosure component.

Turning to FIGS. 10 to 12 these figures show the access control device of FIG. 1 attached to the enclosure component and being disposed at lock and unlock positions.

FIG. 10 shows an unlock configuration. The access control device is shown as being attached to the enclosure component by the shank 11 of the screw fastener of FIG. 6. The head member 12 of the screw fastener is shown as being at a release position. At this position, the distance between the head member 12 and the edge 29 of the enclosure component is such that if the head member 12 abuts the anchor member, as shown, the abutment member 8 is not able to engage or abut the edge 28 of the cover component; in this case the access control device is in an unlock position since the cover component is able to freely pivot open in the direction of the arrow 35. Pushing the access control device in the direction of the arrow 36 will, however, cause the abutment member 8 to eventually be disposed at a lock position wherein the abutment member 8 will be able to abut the cover edge 28 and thus inhibit pivoting of the cover component in the direction of the arrow 35. In this latter case however since the head member 12 will still be at a release position the access control device will not be able to inhibit access to the interior of the enclosure 25 since a would be thief could merely displace the control device to the previously mentioned unlock position. In order to remove the possibility that the device may be displaced to an unlock position the screw fastener is screwed into the opening 30 so as to reduce the distance between the head member 12 an d the edge 29 such that the head member is at a fastening position such as shown in FIG. 11 wherein the abutment component 8 is always able to abut the cover edge 28, i.e. wherein the device may no longer be displaced along the shank 11 to an unlock position. In FIG. 11 the anchor member does not tightly abut the edge 29. FIG. 12 on the other hand shows the screw fastener as urging the anchor member to be in tight abutting engagement with the edge 29. As shown in FIGS. 11 and 12 the abutment member 8 is in more or contact with the edge 28 of the cover component. If desired, in the locking position, the abutment component 8 may be spaced apart from the edge 28; any such spacing should of course not be such so as to allow unlocking of the cover component. The spacing may be achieved by choosing an appropriate closer distance between the hole 30 and the edge 28 of the cover; alternatively the ring component 7 of the access control device may be enlarged to achieve the same result using the hole 30 as shown in FIG. 8. The hole 31 could of course have been used instead of the hole 30 to attach the device to the enclosure component.

Figure 7:
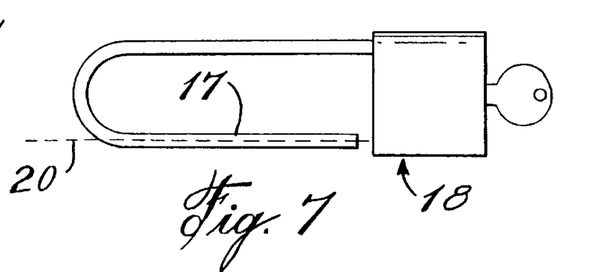
FIG. 7 is illustrates a example padlock wherein the shackle is free for insertion in aperture means so as to render a fastener head means inaccessible for displacement of the head means.
Figure 13:
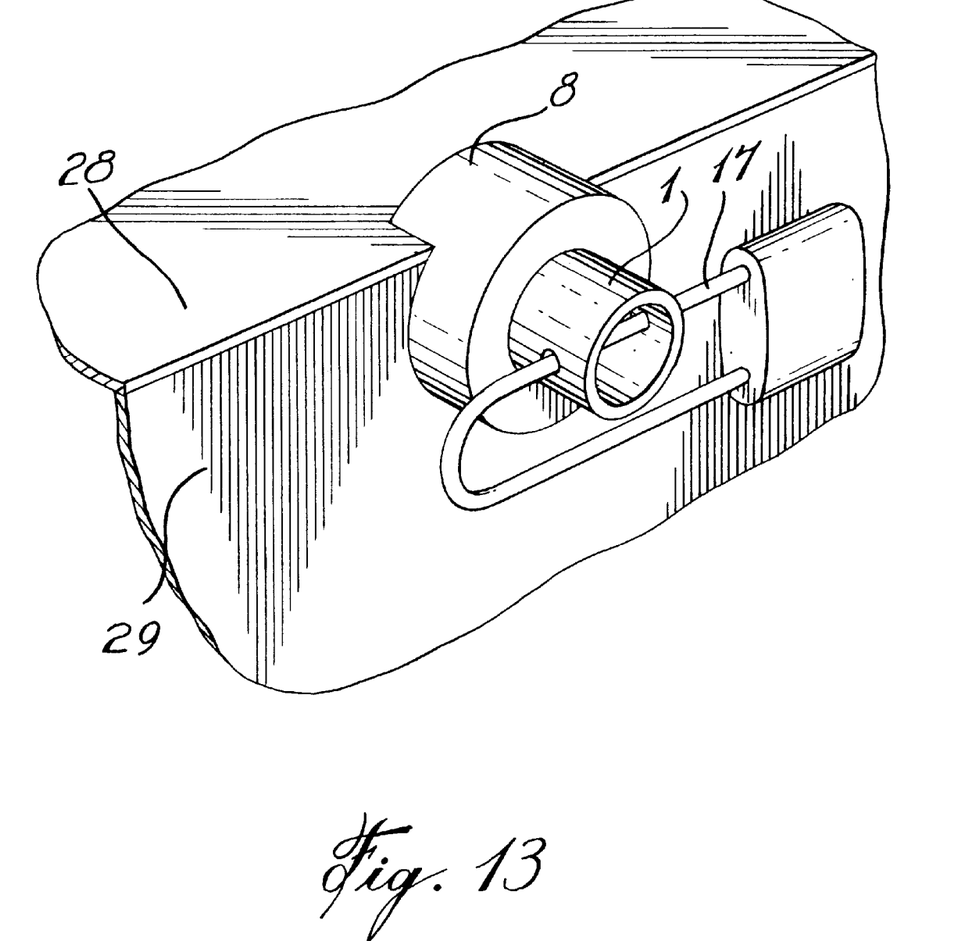
FIG. 13 is an enlarged view of the access control device as shown in FIG. 12 with a padlock shackle locked in place so as to inhibit access to the head means of the screw fastener means.

Once the access control device is in a locking position as seen in FIGS. 11 or 12, the shank 17 of the padlock shown in FIG. 7 may be passed through the sleeve openings 15 and 16 and the shank closed in place to lock the padlock in place; see FIG. 13. Once the shank 17 so blocks the interior of the hollow sleeve 1, the head member 12 may not be accessed by a screw driver or the like so as to displace the head member 12 to, for example, the release position as shown in FIG. 10. It is to be understood of course that the ultimate release position is one wherein the access control device would be completely detached from the enclosure component, i.e. the shank 11 no longer engages the hole 30.

Figure 22:
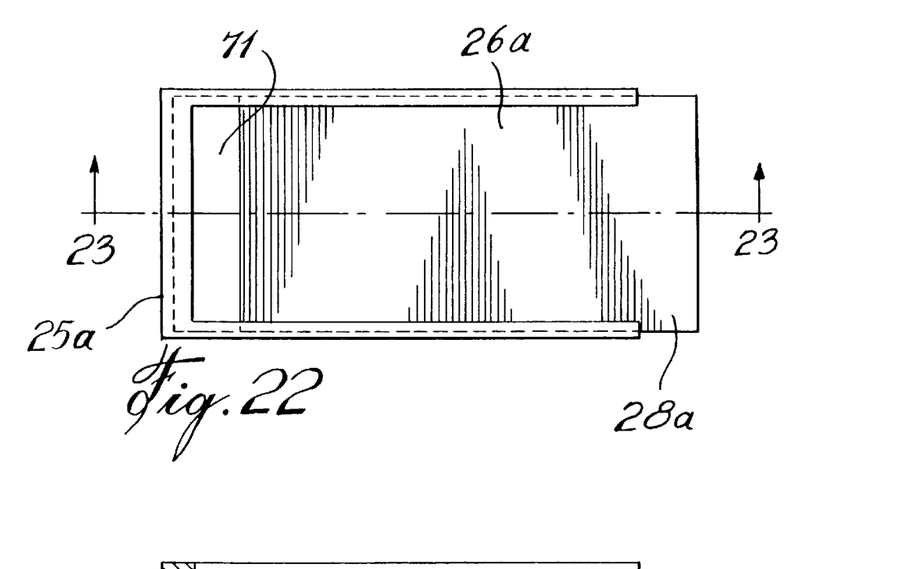
FIG. 22 is a schematic illustration of a top view of an example enclosure component and cover component wherein the cover component is slideably engageable with the enclosure component.
Figure 23:
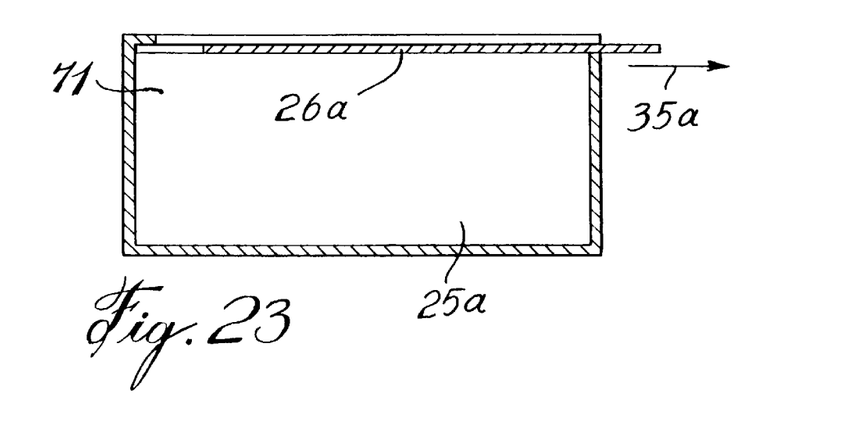
FIG. 23 is a sectional side view along 23—23 of the enclosure component and cover component of FIG. 22, showing the cover component in a slideably engageable groove.

Turning to FIG. 22, this FIG. illustrates an enclosure 25a and a cover 26a which is partially opened. FIG. 23 illustrates longitudinal section of FIG. 22.

Turning FIGS. 14 to 21, these figures illustrate an alternate embodiment of the invention wherein the means for the releasable locking isolation of the fastener means comprises a locking mechanism which is integral with the cover abutment member.

Figure 14:
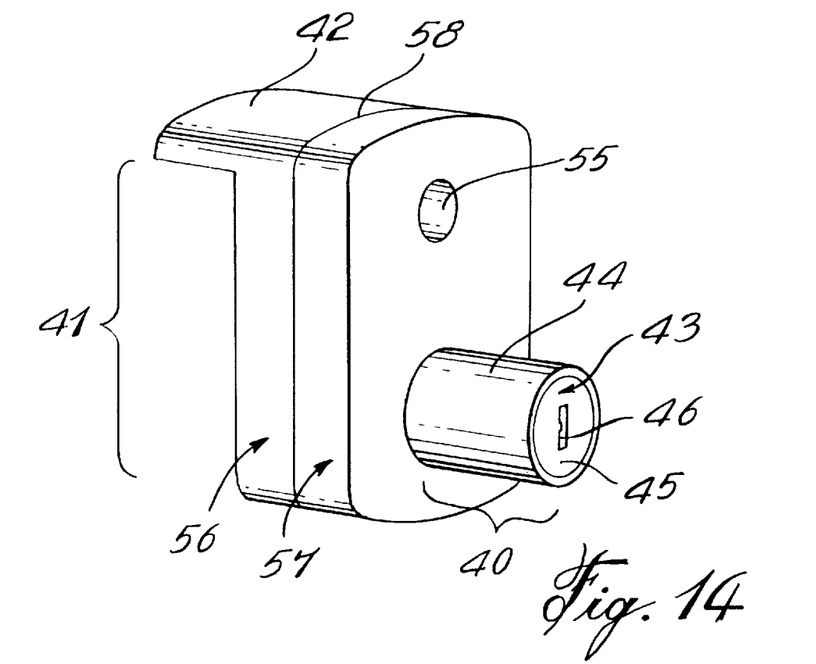
FIG. 14 is a perspective view of an alternate embodiment of the access control device of the present invention wherein the device has a built in locking mechanism for controlling access to the head means of a releasable fastener means.

Referring to FIG. 14, the access control device comprises a lock means 40, an anchor member 41 and a cover abutment member 42.

The lock means 40 comprises a rotatable key plug 43 disposed in a casing 44; referring to FIGS. 14, 16, 17 and 18, the key plug 43 having an outer end 45 for receiving a key in a key slot 46 for the rotation of the plug and an inner end 47. An eccentric stud 48 projects from the inner end 47; the stud 48 is disposed to one side of the longitudinal axis 50 of the key plug 43.

The anchor member 41 is attached to the casing 44. The anchor member 41 comprises an anchor opening means 55. The anchor member comprises abutting first and second moities designated by the reference numerals 56 and 57; the exterior abutment line is designated by reference number 58. The abutment moities are attached together by any suitable fastening means (not shown) such as for example by adhesive, by nut/bolt fastener combinations and the like.

Figure 15:
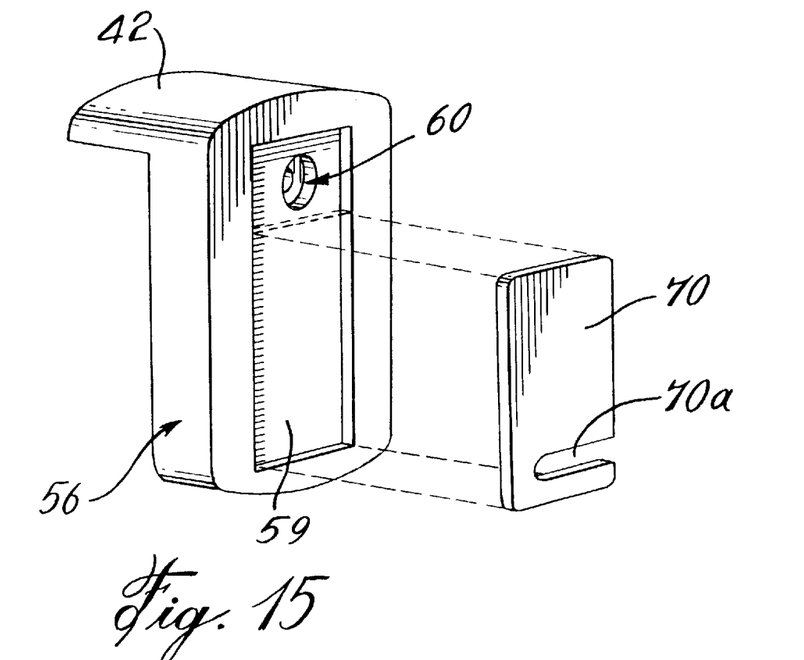
FIG. 15 is a perspective view of a first moitie of the device of FIG. 14, the first moitie including an abutment member for abutting a cover component of a housing (such as for example a box, a container or the like, e.g. a personal computer enclosure) and a lock bolt channel for slidingly engaging a lock bolt member.
Figure 16:
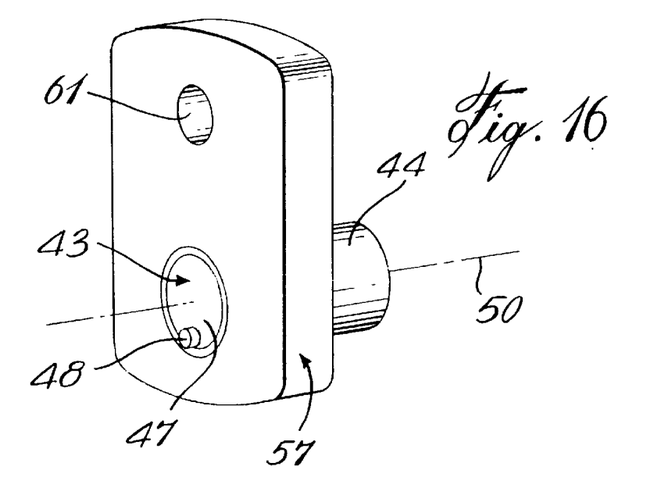
FIG. 16 is a perspective view of a second moitie of the device of FIG. 14, the second moitie including the locking actuation mechanism for displacing a lock bolt member so as to control access to the fastener head means.

Referring to FIG. 15, the cover abutment member 42 projects from the first moitie 56. The first moitie 56 includes a lock bolt channel means 59 and a secondary opening 60. Referring to FIG. 16 the second moitie 57 is attached to the casing 44 and includes a primary opening 61. As may be seen from FIG. 18, the anchor opening means 55 is interrupted or divided by the lock bolt channel 59, i.e. the primary opening 61 is on one side of the channel 59 and the secondary opening 60 is on the other side thereof.

The anchor opening means 55 is able to accommodate a screw threaded shank member of a screw fastener means as shown in FIG. 6, namely a screw fastener comprising a head member 12 attached to shank member 11. The anchor opening means 55 in this case is configured such that the head member 12 is able to pass along with the shank member 11 through the primary opening 61; however while the shank member 11 may pass through the secondary opening 60, the head member 12 is unable to do so (see FIG. 18).

The device shown in FIGS. 14 to 21 includes a lock bolt 70 which is configured to be slidably seated in the lock bolt channel means 59. The lock bolt 70 includes a stud engagement slot 70a.

Figure 19:
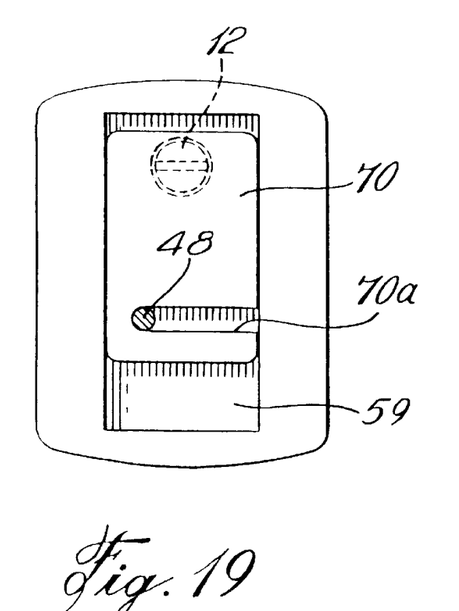
FIG. 19 is a front view of the first moitie as shown in FIG. 15, wherein the lock bolt member is shown covering the anchor opening so as to prevent access to the head of the screw fastener.
Figure 20:
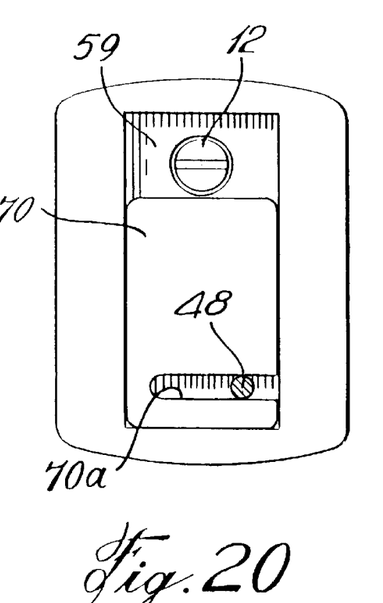
FIG. 20 is a front view of the first moitie as shown in FIG. 15, wherein the lock bolt member is shown as being displaced so as to uncover the anchor opening and provide access to the head of the screw fastener.

Referring to FIGS. 19 and 20, the lock bolt 70 is configured and sized such that the bolt 70 is displaceable between an extended (i.e. covering) position and a retracted (i.e. uncovering) position.

Figure 21:
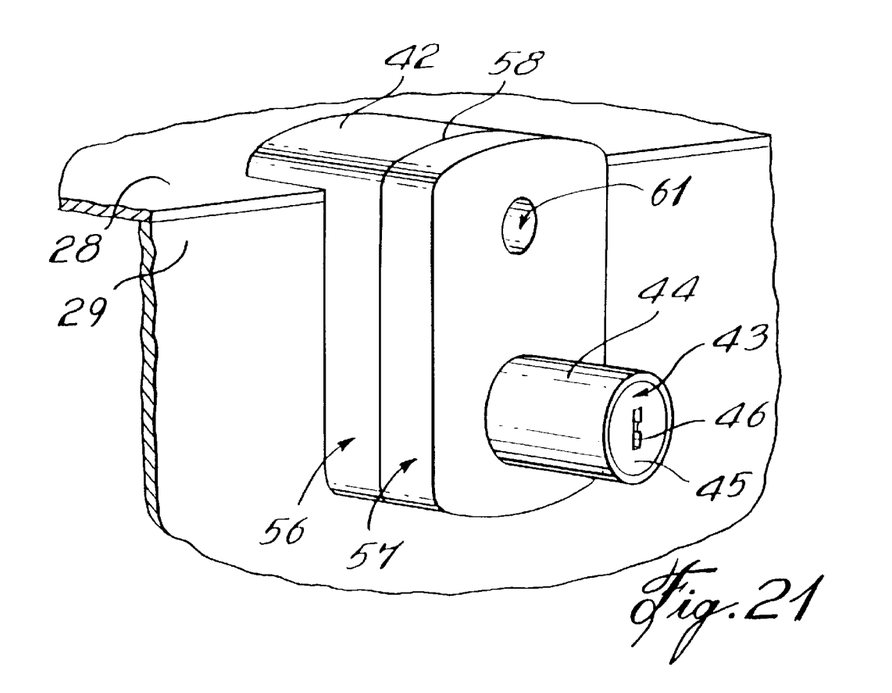
FIG. 21 is an enlarged view of the device of FIG. 14 attached to the enclosure component of FIG. 8 with the cover component closed and locked in place by the device.

In FIG. 19, the bolt 70 is in an extended position wherein the secondary opening 60 is obstructed by the bolt 70 such that the head member 12 of the screw fastener means is inaccessible by a screw driver for the detachment of the shank member 11 from the enclosure component. FIG. 21 further illustrates the extended position of the bolt 70; i.e. the anchor opening means is blocked or obstructed by the bolt 70 such that only the primary opening 61 is accessible.

Figure 17:
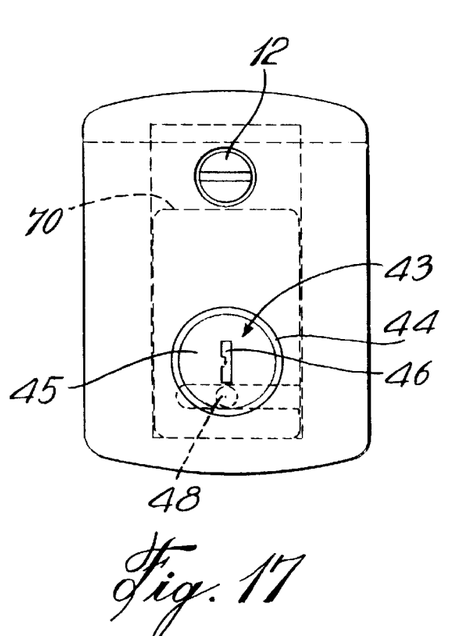
FIG. 17 is a front view of the access control device of FIG. 14 with a screw fastener in the anchor opening thereof.
Figure 18:
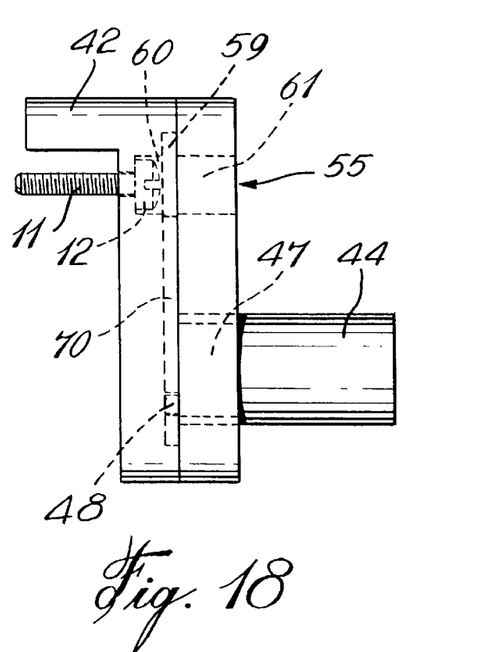
FIG. 18 is a side view of the access control device of FIG. 14 with a screw fastener in the anchor opening thereof.

In FIG. 20, the bolt 70 is shown in a retracted position wherein the secondary opening 60 is unobstructed by said bolt 70 such that the head member 12 of the screw fastener means is accessible by a screw driver for the detachment of the shank member from the enclosure component; i.e. the anchor opening means is not blocked or obstructed by the bolt 70 such that both the primary opening 61 and the secondary opening 60 are accessible by a screw driver. FIG. 17 and 18 further illustrate the retracted position of the bolt 70.

The displacement of the bolt 70 between the extended and retracted positions is induced by rotating the key plug 43 with a key (not shown) disposed in the key slot 46. Rotation of the key plug in turn causes the stud 48 to rotate about the axis 50 of the key plug 43; i.e. clockwise rotation of the plug induces the stud 48 to engage a wall of the stud slot 70a so as to urge the bolt 70 to pass to the extended position whereas counterclockwise rotation induces the stud 48 to engage the opposite wall of the stud slot 70a so as to urge the bolt 70 to pass to the retracted position.

FIG. 21 shows the access control device of FIG. 14 attached to the enclosure component as seen in FIG. 8 with the cover component closed. Assuming that the bolt 70 is placed in a retracted position the previous comments with respect to FIGS. 10 to 12 apply to the unlock and lock positioning of the device of FIG. 14. Once in a lock position the bolt may be positioned in an extended position by rotation of the key plug with the key in the key slot.

Figure 24:
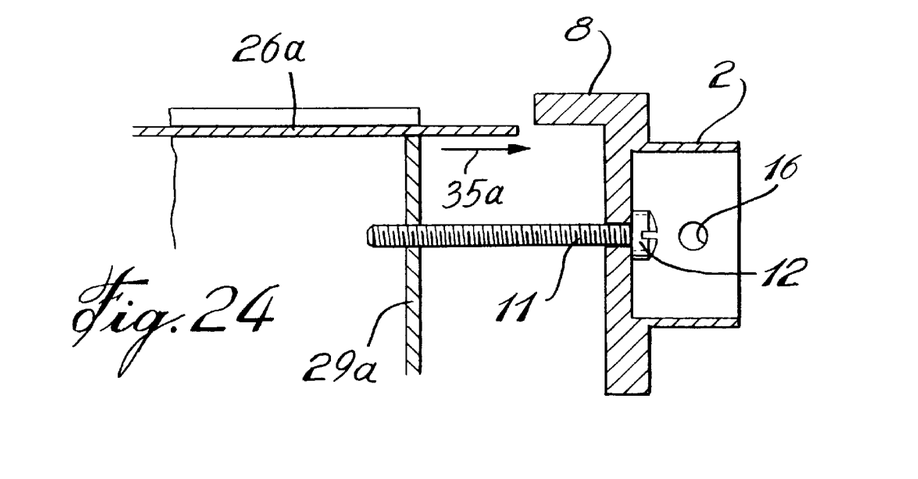
FIG. 24 is an enlarged schematic sectional view of an access control device of the present invention wherein the device is in a partially unlocked position relative to the cover component of FIG. 23.

Referring to FIGS. 22 to 24, these figures illustrate an alternate type of enclosure component and cover component which may be secured by a device as illustrated in FIG. 1. As may be appreciated the enclosure component 25a is provided with groove means disposed on the inner side of three of the side walls of the enclosure component 25a adjacent the opening 71; the remaining wall is configured to allow the cover component 26 to have access to the groove means. The groove means is sized and disposed so as to be able to slidingly engage the cover component 26a which may be entirely separated from the enclosure if so desired; in FIG. 22 the cover component 26a is shown as being disposed such that the opening 71 is partially open or exposed.

FIG. 24 shows an access control device of FIG. 1 attached to the enclosure component 25a such that the cover component may be disposed so as to partially expose the opening 71. The access control device 1 is shown as being attached to the enclosure by the shank 11 of the screw fastener of FIG. 6. The head member 12 of the screw fastener is shown as being at some distance from the enclosure component. At this position, the distance between the head member 12 and the edge 29a of the enclosure component is such that if the head member 12 abuts the closed end 4 as shown, the abutment member 8 is not able to engage or abut the edge 28a of the cover component 26a; in this case the access control device is in a partially unlocked position since the cover component is able to partially freely slide in the direction of arrow 35a, exposing a part of the opening 71. In order to close the partial opening, the screw fastener may be screwed into the opening in the edge 29a of the enclosure component 25a so as to reduce the distance between the head member 12 and the edge 29a, i.e. so that the head member is at a fastening position identical to that shown in FIG. 12. The cover component 26a is sized such that when the head member is in such a fastening position all of the opening 71 is closed off and such that the device is able to impede movement of the cover component in direction of arrow 35a.

Once the access control device is in a locking position such as seen in FIG. 12 the shank 17 of the padlock shown in FIG. 7 may be passed through the sleeve opening 15 and 16 and the shank closed in place to lock the padlock in place; see FIG. 13. Once the shank 17 so blocks the interior of the whole sleeve 1, the head member 12 may not be accessed by a screwdriver or the like to displace the head member 12 to, for example, the partially released position as shown in FIG. 24. It is to be understood of course that the ultimate release position is one wherein the access control device would be completely detached from the enclosure component, i.e. the shank 11 no longer engaging the hole in the edge 29a.

Figure 25:
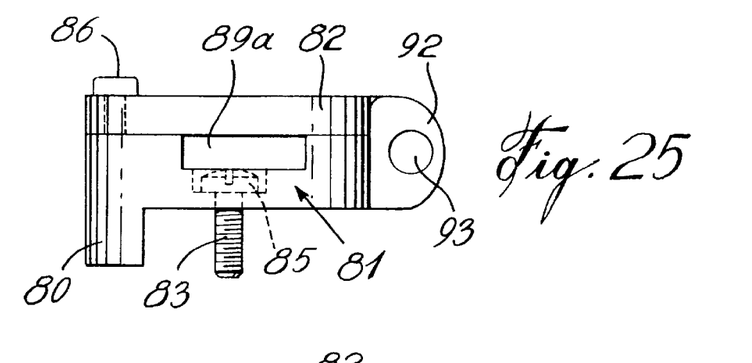
FIG. 25 is a side view of another example embodiment of an access control device of the present invention wherein the device itself is provided with a displaceable cover component shown as being disposed for the definition of a cable opening.
Figures 26, 27, 28:
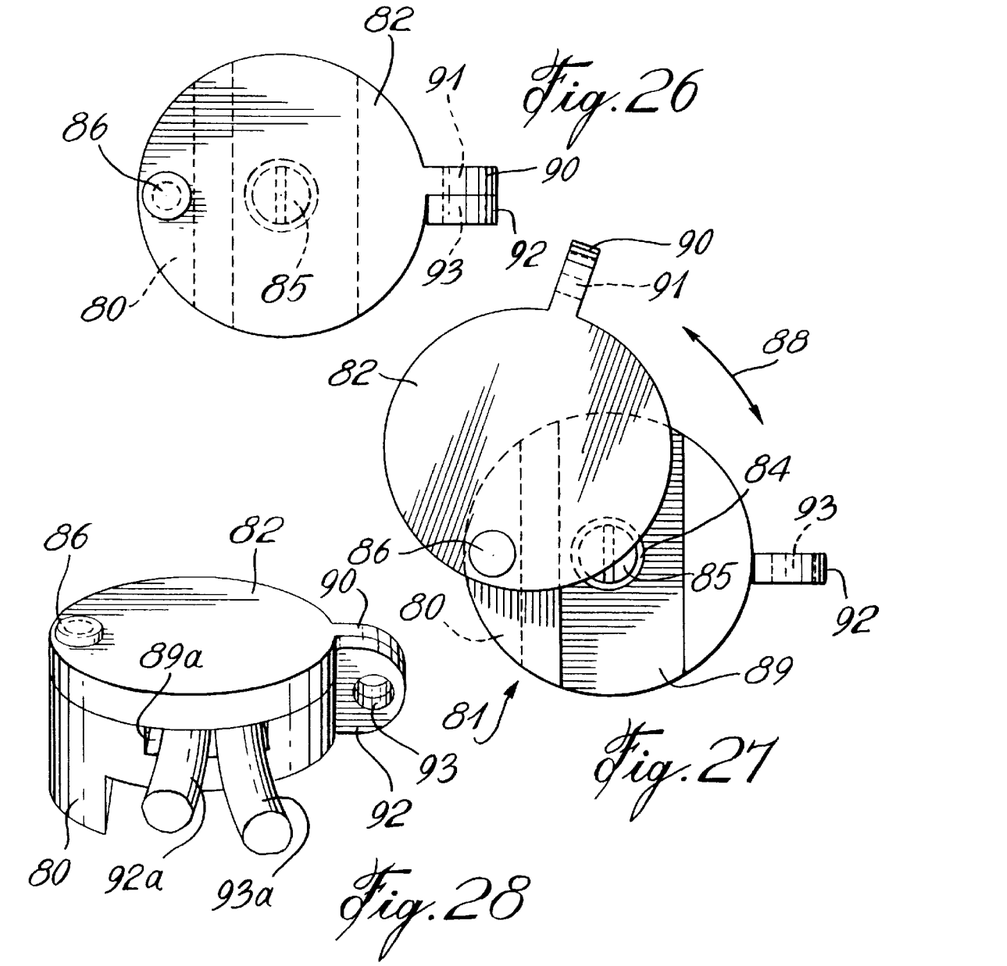
FIG. 26 is a top view of the another example embodiment of an access control device of the present invention of FIG. 25.
FIG. 27 is another top view of the example embodiment of FIG. 25 but wherein the cover component is pivoted to one side so as to expose the cable channel and the head of a screw fastener.
FIG. 28 is perspective view of the example embodiment of FIG. 25 but wherein cables are shown disposed in the cable channel.
Figure 29:
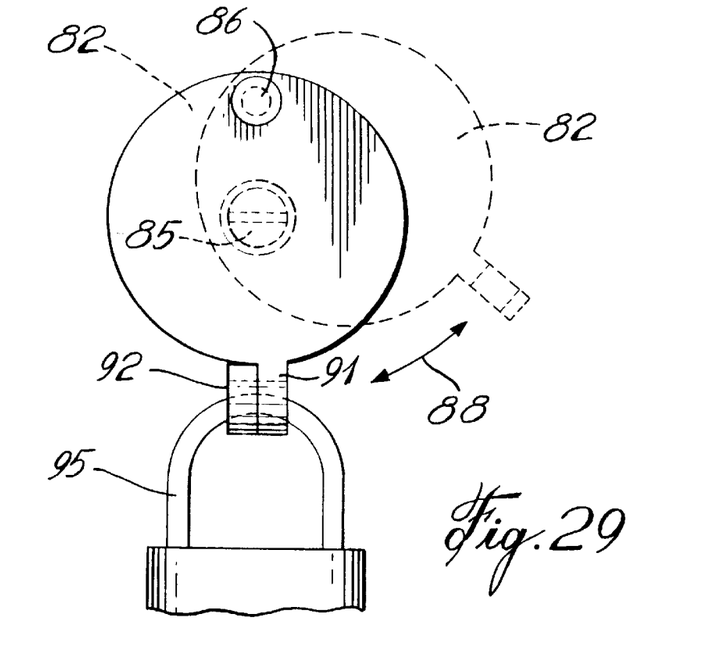
FIG. 29 is a top view of the embodiment shown in FIG. 25 associated with a lock.

FIGS. 25 to 30, these figures illustrate another example embodiment of an access control device of the present invention wherein the device is additionally able to define a cable opening for attaching peripheral devices to the computer itself. Referring to FIG. 27 the device has an abutment component or cover engagement 80 which is analogous to the abutment component 8 shown in FIG. 1. The device also has an anchor member 81 and a displaceable cover component 82. The anchor member 81 has an opening for receiving the threaded shaft 83 of a screw; the opening includes a countersunk shoulder part 84 for seating the head 85 of the screw. The cover component 82 is pivotally attached to the anchor member by pivot means 86. The cover component is able to pivot sideways back and forth about the pivot means 86 in the directions of the double headed arrow 88 (see FIGS. 27 and 29).

Alternatively if desired the cover component 82 may be attachable to the anchor component 81 in any other manner which allows for covering and exposing the cable channel as desired. For example, the cover component 82 may be hingedly connected to the anchor member 81 in a manner analogous to the manner in which the cover 26 is hingedly connected to the enclosure 25 as seen in FIG. 8; as another alternative a tongue and groove type arrangement may be used wherein one of the cover and anchor components has a T-shape projection and the other has a correspondingly shaped groove for sliding engagement therebetween.

Turning back to FIG. 27, the anchor component 81 is provided with a cable channel 89. The cable channel 89 extends from one side of the anchor member 81 to the other side thereof such that the channel 89 is open ended. The opening for receiving the screw interrupts the floor of the channel 89. In FIG. 27 the cover component is shown as being disposed such that the channel 89 is only partially exposed. As may be appreciated from FIG. 27 the cover component may be pivoted so as to completely expose the channel 89 and as a consequence allow for access to the head 85 of the screw.

The cover component 82 includes a projection 90 which has an opening 91. The anchor member 81 also comprises a projection 92 which also has an opening 93. The projections 90 and 92 are configured and disposed such that when the cover component is displaced from the position shown in FIG. 27 to the covering position shown in FIG. 26 the openings 91 and 93 are aligned so as to be able to receive the shackle 95 of a pad lock (see FIG. 29).

Referring to FIGS. 25 and 28, once the cover component 82 is in a covering position as shown in FIG. 26, the cable channel 89 and the cover component 82 define a cable opening designated in FIGS. 25 and 28 by the reference numeral 89a.

Figure 30:
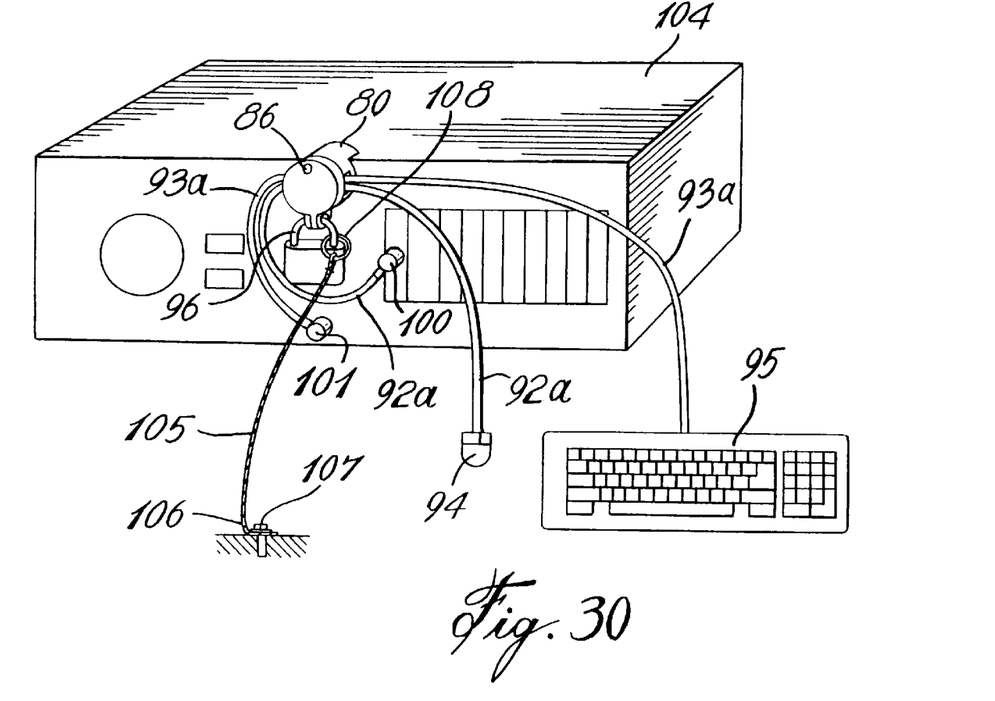
FIG. 30 is a perspective view of the embodiment shown in FIG. 25 associated with a lock and attached to a computer housing wherein cables of peripheral devices are disposed in the cable opening.

Referring to FIG. 28, the channel opening 89a is sized so as to be able to receive parts of the cables 92 and 93 of the respective mouse 94 and the keyboard 95 (see FIG. 30). As shown in FIG. 30 the locking device is attached to a computer housing in a locking configuration with the cables 92 and 93 passing through the cable opening 89a. The cable opening 89a is not only sized smaller than the mouse 94 and the keyboard 95 but is also sized smaller than the connector ends 100 and 101 of the mouse 94 and the keyboard 95. As may be appreciated, the mouse 94 and the keyboard 95 are thus both effectively attached to the computer by the locking device which at the same time locks shut the cover component 104 of the computer by the abutment component 80. The cables may be detached by removing the lock and pivoting the cover component 82 so as to expose the channel 89.

As an added anti-theft feature a cable 105 may be attached at one end 106 to a wall, table, etc. by an attachment member 107 (e.g. bolt); the other end of the cable 105 may be provided with a ring element 108 having a ring opening through which the lock shackle 96 may pass such that the cable 106 is held fast to the pad lock. In this way the entire computer as well as the peripheral devices may be locked in place at a work station.

As an alternative to the device in FIGS. 25 to 30, a device illustrated in FIG. 1 may be provided, on the same side of the anchor member as the abutment component 8, with an additional shorter projection. Any such shorter projection may be spaced apart from the abutment component 8 so as to define a cable channel. The shorter member will, once the access control device is in the locking position shown in FIG. 12 allow the opposed wall of the enclosure and the device to define a cable opening as described above. The smaller projection must of course be sized such that the abutment component 8 may still engage the cover component.

I claim:

1. An access control device for a housing comprising an enclosure component having an access opening for allowing access to the interior of said enclosure component and a cover component, said cover component being displaceable between a closed position wherein said opening is covered and an open position wherein said opening is uncovered, said device comprising:

an anchor member comprising an anchor opening;

a cover engagement member for engaging the cover component, said cover engagement member being integral with said anchor member, said anchor opening being configured such that a head member of a releasable fastener means is unable to pass therethrough, said anchor member and said cover engagement member being configured and disposed such that said releasable fastener means is able to be attached to the enclosure component, through said anchor opening, such that said head member is disposed at a fastening position wherein said head member is able to maintain said device in a lock position wherein said cover engagement member is able to engage said cover component when said cover component is in said closed position;

means for the releasable locking isolation of the fastener means so as to render the fastener means inaccessible for the displacement of said head member from said fastening position to a release position wherein the device is displaceable from said lock position to an unlock position wherein said cover engagement member is unable to engage said cover component, wherein said means for the releasable locking isolation of the fastener means comprises a displaceable cover component hingedly connected to said anchor member, said displaceable cover component being displaceable between a first position wherein said fastener means is accessible for the displacement of said head member from said fastening position to a release position wherein the device is displaceable from said lock position to an unlock position wherein said cover engagement member does not engage said cover component of said housing, to a second position wherein said fastener means is inaccessible thereto, said displaceable cover component comprising a first aperture for receiving therein a lock shackle of a padlock, said anchor member comprising a second aperture for receiving therein a lock shackle of a padlock, wherein said first and second apertures are configured and disposed such that when said displaceable cover component is in said second position, said first and second apertures are in alignment and may each receive therethrough a lock shackle of a same padlock.

2. An access control device as defined in claim 1 wherein said means for releasable locking isolation of the fastener means comprises lock shackle support means projecting from said anchor member, said shackle support means comprising aperture means for receiving a lock shackle of a padlock so as to render the head member of the screw fastener means inaccessible for the displacement of the head member from said fastening position to said release position.

3. An access control device as defined in claim 1 wherein said anchor opening has a longitudinal axis and wherein said cover engagement member comprises a connector component and a cover abutment component, said connector component being disposed transversely to said longitudinal axis, said cover abutment component extending transversely from said connector component for engaging said cover component.

4. An access control device for a housing comprising an enclosure component having an access opening for allowing access to the interior of said enclosure component and a cover component, said cover component being displaceable between a closed position wherein said opening is covered and an open position wherein said opening is uncovered, said device comprising a hollow sleeve, and a cover engagement member, said hollow sleeve comprising side wall means, an open end and a closed end, said closed end being provided with an anchor opening having a longitudinal axis, said anchor opening being able to accommodate a screw threaded shank member of a screw fastener means and being configured such that a head member attached to said shank member is unable to pass therethrough, said cover engagement member comprising an abutment component and a connector component, said connector component being connected to said sleeve and being disposed transversely to said longitudinal axis, said abutment component extending transversely from said connector component for abutting the cover component, said hollow sleeve and said cover engagement member being configured and disposed such that said screw fastener means is insertable through the open end of said sleeve and said shank member is insertable through said anchor opening for releasable screw attachment of the head member to the enclosure component at a fastening position wherein the device is able to be maintained by said head member in a lock position wherein said abutment component is able to abut said cover component, and said hollow sleeve being provided with aperture means in the side wall means thereof for receiving a lock shackle of a padlock transversely to said longitudinal axis so as to render the head member of the screw fastener means inaccessible for the displacement of the head member from said fastening position to a release position wherein the device is displaceable from said lock position to an unlock position wherein said abutment component is unable to engage said cover component.

5. An access control device as defined in claim 4 wherein said connector component is connected to the closed end of said sleeve.

6. An access control device for a housing comprising an enclosure component having an access opening for allowing access to the interior of said enclosure component and a cover component, said cover component being displaceable between a closed position wherein said opening is covered and an open position wherein said opening is uncovered, said device comprising     a cover abutment member for abutting the cover component,     lock means comprising a rotatable key plug disposed in a casing, said key plug having an outer end for receiving a key for the rotation of said plug and an inner end,     an anchor member attached to the casing, said anchor member comprising anchor opening means and lock bolt channel means, said anchor opening being able to accommodate a screw threaded shank member of a screw fastener means comprising a head member attached to said shank member, said anchor opening being configured such that the head member is unable to pass therethrough,         said screw fastener means being able to attach the head member thereof to the enclosure component through said anchor opening at a fastening position wherein the device is able to be maintained by said head member in a lock position wherein said cover engagement member is able to engage said cover component,     a lock bolt seated in said lock bolt channel means and being displaceable between an uncover position wherein the anchor opening is unobstructed by said bolt and a cover position wherein the anchor opening is obstructed by said bolt, the head member of the screw fastener means, when said lock bolt is in said uncover position, being accessible for displacement from said fastening position to a release position wherein the device is displaceable from said lock position to an unlock position wherein said cover engagement member is unable to engage said cover component, the head member of the screw fastener means, when said lock bolt is in said cover position, being inaccessible for the displacement of said head member from said fastening position to said release position,     said inner end of said key plug, said anchor opening, said lock bolt and said lock bolt seat being configured and disposed such that said lock bolt is displaceable, by rotation of said plug, between said uncovered position and said covered position.

\* \* \* \* \*